United States Patent

Kobayashi et al.

(10) Patent No.: US 6,774,200 B2
(45) Date of Patent: Aug. 10, 2004

(54) SILSESQUIOXANE POLYMER MOLDING AND METHOD OF PREPARING SAME

(75) Inventors: Toshiaki Kobayashi, Ushiku (JP); Teruyuki Hayashi, Matsudo (JP); Masato Tanaka, Tokyo (JP)

(73) Assignee: National Institute of Advanced Industrial Science and Technology (JP)

(*) Notice: Subject to any disclaimer, the term of this patent is extended or adjusted under 35 U.S.C. 154(b) by 0 days.

(21) Appl. No.: 10/084,456

(22) Filed: Feb. 28, 2002

(65) Prior Publication Data

US 2002/0143132 A1 Oct. 3, 2002

(30) Foreign Application Priority Data

Mar. 27, 2001 (JP) ........................................ 2001-091159

(51) Int. Cl.$^7$ .............................................. C08G 77/12
(52) U.S. Cl. ........................... 528/31; 528/32; 525/478; 264/299; 264/319
(58) Field of Search ..................... 528/31, 32; 525/478; 264/299, 319

(56) References Cited

U.S. PATENT DOCUMENTS 3,624,190 A * 11/1971 Cekada, Jr. et al.
5,650,485 A * 7/1997 Sun et al. .................... 528/483
6,252,030 B1 * 6/2001 Zank et al.
6,271,297 B1 * 8/2001 Ishida

OTHER PUBLICATIONS

Merriam–Webster's Collegiate Dictionary, 10$^{th}$ Ed., (1993).*
N. Auner et al, "Chemistry of Hydrogen–Octasilsesquioxane . . . " Chem. Mater., vol. 12, pp. 3402–3418.

* cited by examiner

Primary Examiner—Kuo-Liang Peng
(74) Attorney, Agent, or Firm—Lorusso, Loud & Kelly

(57) ABSTRACT

A molding obtained by heating a hydrosilylated polymer at a temperature higher than the softening point or melting point thereof. The hydrosilylated polymer is obtained by reacting at least one hydridosilsesquioxane compound of the following formula (1):

$$(HSiO_{3/2})_n \tag{1}$$

wherein n is an integer of 4–1000, with at least one divinylsiloxane compound of the following formula (2):

$$CH_2{=}CH{-}SiR_2{-}O{-}(SiR_2.O)_q{-}(SiR'_2.O)_{q'}{-}SiR_2{-}CH{=}CH_2 \tag{2}$$

wherein R and R' are independently selected from alkyl groups, substituted alkyl groups, aryl groups and substituted aryl groups, and q and q' are each an integer of 0 or more.

10 Claims, No Drawings

SILSESQUIOXANE POLYMER MOLDING AND METHOD OF PREPARING SAME

BACKGROUND OF THE INVENTION

This invention relates to a molding of a heat-resisting silicon-containing organic polymer having siloxane bonds and to a method of preparing same.

Various types of heat-resisting, silicone-type silicon-containing resins are known such as a silicone resin which is a sort of silsesquioxane polymers. Such silicone resins are used as a coating material, a binder for powder, a sealing agent, a resist material, an electrically insulating material, a paint or a primer. It is, however, difficult to produce a molding of such silicone resins.

The present inventors disclose in JP-A-2000-154252 (Japanese patent No. 2,979,145) a hydrosilylated polymer obtained by reacting octakis(hydridosilsesquioxane), namely pentacyclo-$[9.5.1.1^{3,9}.1^{5,15}.1^{7,13}]$ocatasiloxane, which is one of a cage-type hydridosilsesquioxanes, with a divinylsiloxane of the formula $CH_2=CH-Si(CH_3)_2-O-Si(CH_3)_2-CH=CH_2$. This polymer, which is soluble in organic solvents and has a melting point, gives residues in an amount of 89.3% of the original weight when heated to 984° C. in the atmosphere of nitrogen at a heating rate of 10° C. per minutes. In this case, the temperature $T_{d5}$ at which the original weight decreases by 5% is 595° C. When heated in air to 983° C. at a heating rate of 10° C. per minutes, the polymer leaves residues in an amount of 92.4% of the original weight. The $T_{d5}$ is 569° C. Thus, the polymer has excellent heat resistance and excellent fire resistance.

U.S. Pat. No. 6,252,030 discloses a hydrogenated octasilsesquioxane-vinyl group-containing compound copolymer which is soluble in organic solvents and useful as an insulating material. It is described that the SiH functionality at the corners of the cage structure of the copolymer form siloxane bonds with the SiH functionality of other cage structure corners when the copolymer is heated, allowed to stand, or otherwise handled after being applied to the required area in a mode of coating, packing, molding, or the like and that the copolymer can be used to construct a three-dimensionally reticulated structure, creating a cover film, layer, molded article, or interlayer insulation material with excellent mechanical properties and improved stability, heat resistance, oxidation resistance, and insulation characteristics. However, only specifically disclosed in the U.S. patent is the formation of coatings by using a spin coating method. Further, the U.S. patent describes that the copolymer will have adequate storage stability if stored so that it does not come into contact with water and that, after the copolymer has been applied by coating, dipping, or another such means, it absorbs the moisture in the air (and is heated if needed), which promotes crosslinking and curing, resulting in a layer and coating film having the necessary mechanical and electrical insulating characteristics. Thus, the U.S. patent is silent with respect to a method of preparing moldings using the copolymer.

SUMMARY OF THE INVENTION

The present invention has been made in view of the above state of the art.

It is an object of the present invention to provide an insoluble and infusible molding of a silsesquioxane polymer using a hydrosilylated polymer.

Another object of the present invention is to provide a method which can prepare the above molding in a simple manner.

In accordance with the present invention there is provided a molding obtained by heating a hydrosilylated polymer at a temperature higher than the softening point or melting point thereof, said hydrosilylated polymer being obtained by reacting at least one hydridosilsesquioxane compound of the following formula (1):

$$(HSiO_{3/2})_n \qquad (1)$$

wherein n is an integer of 4–1000, with at least one divinylsiloxane compound of the following formula (2):

$$CH_2=CH-SiR_2-O-(SiR_2.O)_q-(SiR'_2.O)_{q'}-SiR_2-CH=CH_2 \qquad (2)$$

wherein R and R' are independently selected from alkyl groups, substituted alkyl groups, aryl groups and substituted aryl groups, and q and q' are each an integer of 0 or more.

In another aspect, the present invention provides a method of preparing a molding, comprising the steps of:

(a) providing a hydrosilylated polymer obtained by reacting at least one hydridosilsesquioxane compound of the following formula (1):

$$(HSiO_{3/2})_n \qquad (1)$$

wherein n is an integer of 4–1000, with at least one divinylsiloxane compound of the following formula (2):

$$CH_2=CH-SiR_2-O-(SiR_2.O)_q-(SiR'_2.O)_{q'}-SiR_2-CH=CH_2 \qquad (2)$$

wherein R and R' are independently selected from alkyl groups, substituted alkyl groups, aryl groups and substituted aryl groups, and q and q' are each an integer of 0 or more, and (b) heating said hydrosilylated polymer at a temperature higher than the softening point or melting point thereof.

Other objects, features and advantages of the present invention will become apparent from the detailed description of the preferred embodiments of the invention to follow.

DETAILED DESCRIPTION OF THE PREFERRED EMBODIMENTS OF THE INVENTION

A silicon-containing polymer molding according to the present invention is prepared from a hydrosilylated polymer which is obtained by reacting at least one hydridosilsesquioxane compound of the following formula (1):

$$(HSiO_{3/2})_n \qquad (1)$$

wherein n is an integer of 4–1000, with at least one divinylsiloxane compound of the following formula (2):

$$CH_2=CH-SiR_2-O-(SiR_2.O)_q-(SiR'_2.O)_{q'}-SiR_2-CH=CH_2 \qquad (2)$$

wherein R and R' are independently selected from alkyl groups, substituted alkyl groups, aryl groups and substituted aryl groups, and q and q' are each an integer of 0 or more. The hydrosilylated polymer is soluble in organic solvents and has excellent heat resistance, excellent chemical resistance, excellent electrically insulating properties and excellent mechanical properties such as strengths and toughness.

The hydridosilsesquioxane compound of the above formula (1) may be, for example, octakis-(hydridosilsesquioxane), decakis(hydridosilsesquioxane), dodecakis(hydridosilsesquioxane) or a hydridosilsesquioxane oligomer. Octakis-(hydridosilsesquioxane) is preferably used for the purpose of the present invention. These hydridosilsesquioxane compounds may be used singly or as a mixture of two or more.

In the above formula (2) representing the divinylsiloxane compound, R and R' may be, for example, an alkyl group such as methyl, ethyl, isopropyl, tert-butyl or hexyl, or an aryl group such as phenyl, tolyl, anisyl or naphthyl. The alkyl may have one or more substituents such as aryl and alkoxy, while the aryl group may have one or more substituents such as alkyl and alkoxy. The alkyl and aryl groups of R and R' may have other substituents which are inert to the hydrosilylation reaction of the compounds of the formulas (1) and (2).

Specific examples of divinylsiloxane compounds include 1,3-divinyltetramethyldisiloxane, 1,5-divinylhexamethyltrisiloxane, 1,7-divinyloctamethyltetrasiloxane, $\alpha,\omega$-divinylpoly(dimethylsiloxane), 1,3-divinyltetraphenyldisiloxane, 1,5-divinylhexaphenyltrisiloxane, 1,7-divinyloctaphenyltetrasiloxane, $\alpha,\omega$-divinylpoly(diphenylsiloxane), vinyl-terminated diphenylsiloxane-dimethylsiloxane copolymers. These divinylsiloxanes may be used singly or as a mixture of two or more.

The reaction of the hydridosilsesquioxane compound of the above formula (1) with the divinylsiloxane compound of the above formula (2) is generally carried out in the presence of a customarily employed catalyst such as a platinum-containing catalyst.

Specific examples of the platinum-containing catalyst include platinum divinyltetramethyldisiloxane, platinum cyclic vinylmethylsiloxane, tris(dibenzylideneactone)diplatinum, chloroplatinic acid, bis(ethylene)tetrachlorodiplatinum, cyclooctadienedichloroplatinum, bis(cyclooctadiene)platinum, bis(dimethylphenylphosphine)dichloroplatinum, tetrakis(triphenylphosphite)platinum and platinum carbon. The hydrosilylation may be carried out using a solvent such as toluene, benzene, hexane or an ether. The reaction temperature is not specifically limited and generally in the range from 0° C. to the boiling point of the solvent. The molar ratio of the hydridosilsesquioxane compound of the above formula (1) to the divinylsiloxane compound of the above formula (2) is generally 2:1 to 1:4.

The hydrosilylated polymer obtained by the reaction of the hydridosilsesquioxane compound of the above formula (1) with the divinylsiloxane compound of the above formula (2) may be used as a raw material for the production of a molding. If desired, one or more other polymers such as thermosetting resins and one or more additives such as colorants and fillers may be incorporated into the raw material.

The production of a molding may be carried out by heating the raw material in a mold cavity at a temperature higher than the softening point or the melting point of the hydrosilylated polymer to cure the polymer. The heating temperature varies according to the kind of the hydrosilylated polymer used but is generally in the range of 50–250° C.

In one preferred embodiment, the heating is performed under a reduced pressure while gradually increasing the temperature at a rate of 1–100° C./minute to a predetermined maximum temperature in the range of 50–250° C. The heat treatment is thereafter preferably completed at the maximum temperature or higher in a mold cavity.

In another preferred embodiment, the heat treatment comprises (b1) heating the hydrosilylated polymer at a temperature higher than the softening point or melting point of thereof under a reduced pressure, (b2) then heating the hydrosilylated polymer at ambient pressure, and (b3) heating the product obtained in step (b2) in a mold cavity to complete the curing of the hydrosilylated polymer. In this case, steps (b1) and (b2) are successively repeated N-times (N is two or more, preferably 3–100) before step (b3).

Steps (b2) and (b3) are preferably carried out in an inert gas atmosphere such as in a nitrogen atmosphere. The heat treatment temperature in steps (b1) and (b3) is generally in the range of 50–250° C. The final heat treatment (step (b3)) is preferably performed at a temperature higher than that in step (b1). Step (b1) in each of the N-times repetition is performed for a period of at least 0.5 minute, preferably 1–60 minutes. In the N-times repeated heat treatment, the temperature in respective steps (b1) is preferably increased stepwise with an increase of the number N. For example, when steps (b1) and (b2) are successively repeated 10 times (N=10), step (b1) in each of the 1st through 3rd cycles may be performed at a temperature of T1, the 4th through 6th cycles at T2 which is higher than T1, 7th cycle at T3 which is higher than T2, and 8th through 10th at T4 which is higher than T3.

The following examples will further illustrate the present invention.

EXAMPLE 1

Pentacyclo[$9.5.1.1^{3,9}.1^{5,15}.1^{7,13}$] ocatasiloxane ($HSiO_{3/2}$)$_8$) was reacted with equimolar amount of 1,3-divinyltetramethyldisiloxane at room temperature for 3 days with stirring in toluene in the presence of platinum divinyltetramethyldisiloxane to obtain a hydrosilylated polymer (Mw: 4300, Mn: 2900). The polymer (106 mg) was placed in a cavity of a cylindrical female mold having an inside diameter of 10 mm and made of a tetrafluoroethylene resin and heated at 100° C. for 5 minutes under vacuum (0.1 mmHg). After the 5 minutes heating, nitrogen gas was fed to the mold. Such a cycle including heating for 5 minutes at 100° C. and subsequent introduction of nitrogen gas was repeated 10 times in total. Next, the contents in the mold were heated at 125° C. for 5 minutes under vacuum (0.1 mmHg). After the 5 minutes heating, nitrogen gas was fed to the mold. Such a cycle including heating for 5 minutes at 125° C. and subsequent introduction of nitrogen gas was repeated 5 times in total. Further, the contents in the mold were heated at 150° C. for 5 minutes under vacuum (0.1 mmHg). After the 5 minutes heating, nitrogen gas was fed to the mold. Such a cycle including heating for 5 minutes at 150° C. and subsequent introduction of nitrogen gas was repeated 10 times in total. Then, after the female mold had been closed with a male mold, the contents in the molds were heated to 175° C. and maintained at that temperature overnight. The thus obtained molding was allowed to cool to room temperature in the atmosphere of nitrogen and then taken out of the molds. The molding was in the form of a transparent disc having a thickness of about 1 mm and a diameter of 10 mm. The molding did not melt at a temperature up to 300° C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of preparing a molding, comprising the steps of:

(a) providing a hydrosilylated polymer obtained by reacting at least one hydridosilsesquioxane compound of the following formula (1):

wherein n is an integer of 4–1000, with at least one divinylsiloxane compound of the following formula (2):

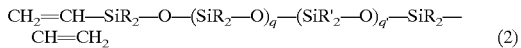

wherein R and R' are independently selected from alkyl groups, substituted alkyl groups, aryl groups and substituted aryl groups, and q and q' are each an integer of 0 or more; and (b) heating the hydrosilylated polymer at a temperature higher than the softening point or melting point thereof under a reduced pressure;

(c) then heating the hydrosilylated polymer at ambient pressure; and (d) heating the product obtained in step (c) in a mold cavity to complete the curing of the hydrosilylated polymer, steps (b) and (c) being successively repeated at least twice before step (d).

2. A method as claimed in claim 1, wherein n in the formula (1) of said hydridosilsesquioxane is 8.

3. A method as claimed in claim 1, wherein said heating is at 50–250° C.

4. A method as claimed in claim 1 wherein said step (c) is performed in an inert gas atmosphere.

5. A method as claimed in claim 4 wherein said step (d) is performed in an inert atmosphere.

6. A method as claimed in claim 1 wherein said step (d) is performed in an inert gas atmosphere.

7. A method as claimed in claim 6 wherein said step (b) is repeated at successively higher temperatures.

8. A method as claimed in claim 5 wherein said step (b) is repeated at successively higher temperatures.

9. A method as claimed in claim 4 wherein said step (b) is repeated at successively higher temperatures.

10. A method as claimed in claim 1 wherein said step (b) is repeated at successively higher temperatures.

* * * * *